(12) United States Patent
Ouyang et al.

(10) Patent No.: US 9,235,105 B2
(45) Date of Patent: Jan. 12, 2016

(54) TUNABLE OPTICAL FREQUENCY CONVERTER BASED ON A PHASE MODULATOR

(71) Applicant: SHENZHEN UNIVERSITY, Shenzhen (CN)

(72) Inventors: Zhengbiao Ouyang, Shenzhen (CN); Chunchao Qi, Shenzhen (CN)

(73) Assignee: SHENZHEN UNIVERSITY, Shenzhen (CN)

( * ) Notice: Subject to any disclaimer, the term of this patent is extended or adjusted under 35 U.S.C. 154(b) by 0 days.

(21) Appl. No.: 14/360,516

(22) PCT Filed: Oct. 24, 2012

(86) PCT No.: PCT/CN2012/083448
§ 371 (c)(1),
(2) Date: May 23, 2014

(87) PCT Pub. No.: WO2013/075568
PCT Pub. Date: May 30, 2013

(65) Prior Publication Data
US 2014/0300948 A1    Oct. 9, 2014

(30) Foreign Application Priority Data

Nov. 23, 2011    (CN) .......................... 2011 1 0378743

(51) Int. Cl.
*G02F 1/35* (2006.01)
*G02F 2/02* (2006.01)
(Continued)

(52) U.S. Cl.
CPC ................ *G02F 1/353* (2013.01); *G02F 1/113* (2013.01); *G02F 2/02* (2013.01); *H01S 3/1003* (2013.01);
(Continued)

(58) Field of Classification Search
None
See application file for complete search history.

(56) References Cited

U.S. PATENT DOCUMENTS

| 5,946,129 A * | 8/1999 | Xu et al. ........................ 359/332 |
| 2003/0231382 A1* | 12/2003 | Ahn et al. ..................... 359/344 |

FOREIGN PATENT DOCUMENTS

| CN | 102244334 | 11/2011 |
| CN | 102244335 | 11/2011 |
| CN | 102608824 | 7/2012 |

OTHER PUBLICATIONS

Li et al., "Optical frequency multiplication of phase modulator and birefringent fiber," ACTA Photonica Sinica, Jan. 2011, vol. 40, No. 1, pp. 45-49 (English language abstract provided).
Hu et al., "A radio over fiber system with frequency sextuple optical millimeter-wave generation carrying OFDM signal utilizing phase modulator," ACTA Photonica Sinica, Apr. 2010, vol. 29, No. 4, pp. 699-703 (English language abstract provided).
(Continued)

*Primary Examiner* — Hemang Sanghavi
(74) *Attorney, Agent, or Firm* — Hamre, Schumann, Mueller & Larson, P.C.

(57) ABSTRACT

The present invention provides a tunable optical frequency converter based on a phase modulator, which comprises a laser, a first optical isolator and a circulating frequency shift module. Said circulating frequency shift module is composed of an optical coupler, a phase modulator, an optical amplifier, a second optical isolator, a first optical circulator, an optical fiber Bragg grating, a second optical circulator, a tunable filter and a tunable attenuator. Light outputted by said laser is inputted to said circulating frequency shift module to conduct frequency converting repeatedly after passing through the first optical isolator, and then separated by a tunable filter and a second optical circulator, then the frequency converted light is outputted from the port of the circulating frequency shift module. The frequency converter provided in the present invention has a compact volume and fewer optical components, which means it is easy to be integrated, a big frequency converting range, a high frequency converting efficiency and a high output power.

15 Claims, 1 Drawing Sheet

(51) Int. Cl.
  *H01S 3/10* (2006.01)
  *G02F 1/11* (2006.01)
  *H01S 3/067* (2006.01)
(52) U.S. Cl.
  CPC ....... *G02F 2201/17* (2013.01); *G02F 2201/307* (2013.01); *G02F 2203/055* (2013.01); *H01S 3/06791* (2013.01)

(56) References Cited

OTHER PUBLICATIONS

Zhang et al., "Generation of coherent and frequency-lock multi-carriers using cascaded phase modulators and recirculating frequency shifter for Tb/s optical communication," Optics Express, Jul. 2011, vol. 19, No. 14, pp. 12891-12902.

* cited by examiner

TUNABLE OPTICAL FREQUENCY CONVERTER BASED ON A PHASE MODULATOR

FIELD OF THE INVENTION

The present invention relates to a tunable optical frequency converter based on a phase modulator, particularly to a frequency converter capable of broadband tuning based on a phase modulator, circulating frequency shift and filtering technology.

BACKGROUND OF THE INVENTION

Optical frequency down-conversion and up-conversion are essentially the difference-frequency and the sum-frequency technologies. Compared with the traditional method by harmonic generation, the biggest advantage of the difference-frequency and sum-frequency synthesis technology systems is that the systems are portable and compact, and contains richer frequency components. Currently, this technology includes frequency spacing dichotomy, optical parametric oscillator method, nonlinear crystal optical method, laser diode four-wave mixing frequency method, optical frequency comb generator method, and so on. The frequency spacing dichotomy method and the optical frequency comb generator method are more characteristic in these methods. Both methods aim at dividing a large spacing of optical frequencies into a plurality of smaller frequency spacing in a certain relationship with a known frequency which generally can be measured by known means, thus an extremely convenient means is provided for the frequency detection technology.

From another perspective, if we can continue to move the measurable frequencies with small pitch and eventually get arbitrarily frequencies with large spacing, and these arbitrary optical frequencies can also be measured, it would be a very good idea. For example, a known frequency $\omega_{rf}$ is known in advance, now in the vicinity of the original frequency $\omega_c$, via only implementations of known frequency $\omega_{rf}$ multiplication or demultiplication several times, finally, any desired frequency $\omega_c \pm n\omega_{rf}$ can be achieved via the original frequency $\omega_c$. And at this time, the magnitude of each frequency can be shown up through a filter like a frequency "screen". If this idea can really be realized, not only the technology can meet the requirements of the optical frequency measurement, but also any desired frequency of the light source can be obtained.

To realize this idea, the present invention discloses a tunable optical frequency converter based on a phase modulator. The invention will greatly simplify the structure of the frequency-tunable laser, significantly reduce the cost, miniaturize the presently large optical laboratory, since one such tunable optical frequency converter can replace dozens to hundreds of lasers, thus the integrated cost of the optical experiments can be substantially reduced, expected to be widely used in scientific research, industrial production and so on.

SUMMARY OF THE INVENTION

Technical problem to be solved by the present invention is to provide a compact, portable broadband frequency tuning converter which is easy to integrate and can be broadbandly and high-effectively tuned.

The solution to solve the technical problem of the present invention is that: a tunable optical frequency converter based on a phase modulator is provided; the converter includes a laser, a first optical isolator, a circulating frequency shift module based on the phase modulator; light outputted by said laser is inputted to said circulating frequency shift module to conduct frequency shift repeatedly after passing through the first optical isolator, and then separated by a tunable filter and a second optical circulator, then frequency converted light is outputted from the port of the circulating frequency shift module.

The laser is a semiconductor laser, a gas laser, a solid laser or a fiber laser with an operating wavelength in the 100 nm-100000 nm band.

The optimum value of the closed-loop gain coefficient of the circulating frequency shift module based on the phase modulator is 1, the second optimum value is positive integer other than 1, and the third optimum value is the reciprocal value of the positive integer other than 1.

Said circulating frequency shift module based on the phase modulator is composed of an optical coupler, a phase modulator, an optical amplifier, a second optical isolator, a first optical circulator, an optical fiber Bragg grating, a second optical circulator, a tunable filter and a tunable attenuator.

The phase modulator includes a phase modulator and a frequency modulator.

The total power of two combined light beams of said optical coupler can't exceed the maximum allowable light power of the phase modulator.

Said first light circulator is a 3-port circulator, wherein, a first port is connected to the output port of the second optical isolator, a second port is connected to the input port of the optical fiber Bragg grating, and a third port is connected to an absorbing load which absorbs the reflected light from the optical fiber Bragg grating.

Said second light circulator is a 3-port circulator, wherein, a first port thereof is connected to the output port of the optical fiber Bragg grating, a second port is connected to the input port of the tunable filter, and a third port serves as the light output port of the circulating frequency shift module.

The operating frequency bandwidth of respective members in the circulating frequency shift module converting the frequency based on the amplitude modulator is not less than the frequency difference between the maximum output frequency of the output port of the circulating frequency conversion module and that of the laser source.

The operating wavelength bands of said first optical isolator and respective members in the circulating frequency shift module based on the phase modulator are consistent with that of the laser.

Said tunable filter is a narrow-band filter which reflects a narrow-band light desired to be filtered to the third port of the second optical circulator so as to output it, and transmits the light with other frequencies to the input port of the tunable attenuator, the frequency variation of said frequency converter is equal to the difference between the frequency of the narrow-band output light of the tunable filter and that of the output light of the laser, and the tunable frequency range of the frequency converter is not more than that of the narrow-band output light of the tunable filter.

The tunable filter is a frequency-tunable filter manufactured by one-dimensional defect-photonic-crystal technology or optical-diffraction-grating technology.

The photonic forbidden band area of the one-dimensional photonic crystal is not less than the frequency tuning range of the final output light wave of the system, said one-dimensional photonic crystal includes a refractive index adjustable defect layer, the refractive index adjusting method of which includes electro-induced refractive index change, magneto-induced refractive index change, acoustic-induced refractive index change, photo-induced refractive index change, force-induced refractive index change or thermal-induced refractive index change, the one-dimensional photonic crystal has a defect mode which changes along with the change of the refractive index of the defect layer.

The tunable optical frequency converter provided in the present invention has small size, less optical members, low cost, large tuning range, high tuning efficiency, and easy operation, and is easy to be integrated.

BRIEF DESCRIPTION OF THE DRAWINGS

Below in connection with the accompanying drawings and specific embodiments, the present invention will be described in further detail.

DETAILED DESCRIPTION OF THE PREFERRED EMBODIMENTS

Figure 1:
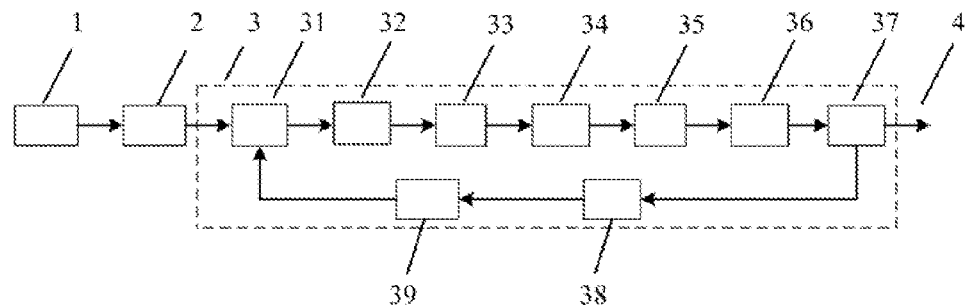
FIG. 1 is a system structure schematic diagram of the tunable optical frequency converter based on the phase modulator in the present invention.

The present invention provides a tunable optical frequency converter based on the phase modulator, as shown in FIG. 1, which includes a laser 1, a first optical isolator 2, and a circulating frequency shift module 3 based on the phase modulator. Light outputted by said laser 1 is inputted to said circulating frequency shift module 3 to conduct frequency shifting repeatedly after passing through the first optical isolator 2, and then separated by a tunable filter 38 and a second optical circulator 37, then frequency converted light is outputted from the port 4 of the circulating frequency shift module.

The laser 1 is a semiconductor laser, a gas laser, a solid laser or a fiber laser with an operating wavelength in the 100 nm-100000 nm band.

The optimum value of the closed-loop gain coefficient of the circulating frequency shift module 3 based on the phase modulator is 1, the second optimum value is positive integer other than 1, and the third optimum value is the reciprocal value of the positive integer other than 1.

The circulating frequency shift module 3 based on the phase modulator is composed of an optical coupler 31, a phase modulator 32, an optical amplifier 33, a second optical isolator 34, a first optical circulator 35, an optical fiber Bragg grating 36, a second optical circulator 37, a tunable filter 38 and a tunable attenuator 39.

The phase modulator of the circulating frequency shift module 3 based on the phase modulator 32 includes a phase modulator and a frequency modulator, which operates by the driving of the high frequency microwave signal. The frequency-shift principle of the phase modulator 32 is that: a microwave signal is used as the modulation signal of the phase modulator, then, after light inputted into the phase modulator passes through the phase modulator, the phase of the light outputted from the phase modulator changes along with the applied microwave modulation signal, and the frequency of the light outputted from the phase modulator changes along with the time derivative of the applied microwave modulation signal. Without loss of generality, assuming the input signal in the phase modulator propagates along z-direction, the input signal is also called a carrier signal, then, the electric vector of the carrier signal is $$E_c = E_{c0} exp[i(\omega_{c0}t - k_c z + \phi_{c0})] \qquad (1)$$

wherein, $E_{c0}$ is the amplitude of the carrier signal, $\omega_{c0}$ is the circular frequency of the carrier signal, t is time, $k_c$ is the wave vector of the carrier signal, $\phi_{c0}$ is the initial phase of the carrier signal; assuming that the microwave modulation signal is $$E_m = E_{m0} \sin(\omega_m t) \qquad (2)$$

wherein, $E_{m0}$ is the amplitude of the microwave modulation signal, $\omega_m$ is the circular frequency of the microwave modulation signal. Then, after being converted once by the phase modulator, the electric vector of the light output from the phase modulator is:

$$E = E_{c0} exp\{i[\omega_{c0}t - k_c z + \phi_{c0} + a_m E_{m0} \sin(\omega_m t)]\} \qquad (3)$$

wherein, $a_m$ is the phase modulation sensitivity, generally, $\omega_{c0} \gg a_m E_{m0}$. Formula (3) is rewritten as following form:

$$E = E_{c0} exp\left\{i\left[\int_0^t [\omega_{c0} + \Delta\omega(t)] dt - k_c z + \varphi_{c0}\right]\right\}, \qquad (4)$$

$$\Delta\omega(t) = \omega_m a_m E_{m0} \cos(\omega_m t)$$

It can be seen by the formula (4) that the maximum frequency shift is $\omega_m a_m E_{m0}$ after the carrier wave passes through the phase modulator once.

In the circulating frequency shift module based on a phase modulator, after the frequency of the light wave is repeatedly shifted N times, the maximum frequency shift amount of $N\omega_m a_m E_{m0}$ is acquired. So long as the frequency shift amount doesn't cause the light frequency to arrive at the selected frequency of the tunable filter, the light wave would be fed back to the circulating frequency shift module without stopping until the frequency shift amount has caused the light frequency to arrive at the selected frequency of the tunable filter.

When being a frequency modulator, the phase modulator 32 directly realizes the frequency shift. Corresponding to the carrier signal given by the formula (1) and the modulation signal given by the formula (2), after being converted once by the frequency modulator, the electric vector of the light outputted from the frequency modulator is:

$$E = E_{c0} exp\{i[(\omega_{c0} + b_m E_{m0} \sin(\omega_m t))t - k_c z + \phi_{c0}]\} \qquad (5)$$

wherein, $b_m$ is the frequency modulation sensitivity, generally, $\omega_{c0} \gg b_m E_{m0}$.

It can be seen from the formula (5), after the carrier wave passes through the frequency modulator once, the maximum frequency shift thereof is $b_m E_{m0}$.

In the circulating frequency shift module based on the frequency modulator, after the frequency is repeatedly shifted N times, the maximum frequency shift amount of $Nb_m E_{m0}$ is acquired. So long as the frequency shift amount doesn't cause the light frequency to arrive at the selected frequency of the tunable filter, the light wave would be fed back to the circulating frequency shift module without stopping until the frequency shift amount has caused the light frequency to arrive at the selected frequency of the tunable filter so far.

The first light circulator 35 is a 3-port circulator, wherein, a first port is connected to the output port of the second optical isolator 34, a second port is connected to the input port of the optical fiber Bragg grating 36, and a third port is connected to an absorbing load which absorbs the reflected light from the optical fiber Bragg grating 36. And the second light circulator 37 is a 3-port circulator, wherein, a first port thereof is connected to the output port of the optical fiber Bragg grating 36, a second port is connected to the input port of the tunable filter 38, and a third port serves as the light output port of the circulating frequency shift module 3.

The operating frequency bandwidth of respective members in the circulating frequency shift module 3 converting the frequency based on the phase modulator is not less than the frequency difference between the maximum output frequency at the output port 4 of the frequency-circulation module and that of the laser 1 source. The operating wavebands of the first optical isolator 2 and respective members in the circulating frequency conversion module 3 based on the amplitude modulator are consistent with that of the laser 1. The total power of the two combined light beams of the optical coupler 31 can't exceed the maximum allowable light power of the phase modulator 32.

The tunable filter 38 of the circulating frequency shift module 3 based on the phase modulator is a narrow-band filter which reflects the narrow-band light desired to be filtered to the third port 4 of the second circulator 37 so as to output it, and transmits the light with other frequencies to the input port of the tunable attenuator 39. The frequency variation of the frequency converter is equal to the difference between the frequency of the narrow-band output light of the tunable filter 38 and that of the output light of the laser 1, and the tunable frequency range of the frequency converter is not more than that of the narrow-band output light of the tunable filter 38.

Figure 2:
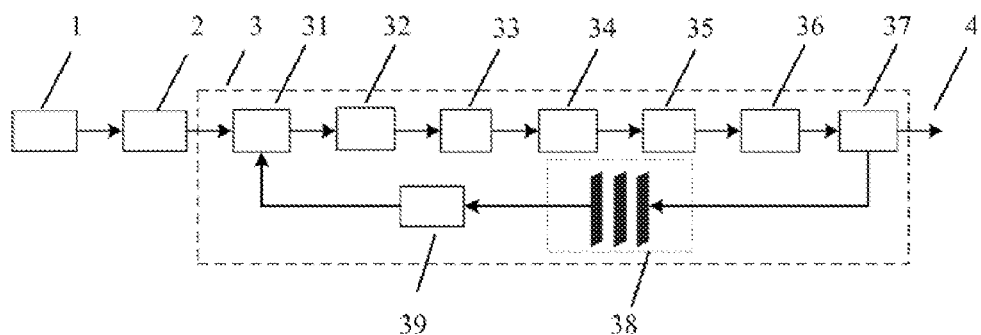
FIG. 2 is a schematic diagram of the first embodiment of the tunable optical frequency converter based on the phase modulator in the present invention.
Figure 3:
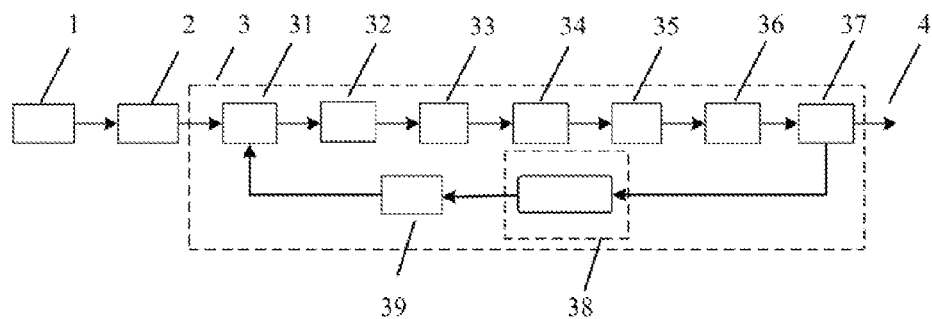
FIG. 3 is a schematic diagram of the second embodiment of the tunable optical frequency converter based on the phase modulator in the present invention.

Preferably, the tunable filter 38 is a Bragg grating manufactured by the diffraction-grating technology (as shown in FIG. 2) or a tunable filter manufactured by one-dimensional defect-photonic-crystal technology (as shown in FIG. 3). The photonic bandgap of the one-dimensional photonic crystal is not less than the frequency tuning range of the final output light wave of the system, said one-dimensional photonic crystal includes a refractive index adjustable defect layer, the refractive index adjusting methods of which include electro-induced refractive index change, magneto-induced refractive index change, acoustic-induced refractive index change, photo-induced refractive index change, force-induced refractive index change or thermal-induced refractive index change. The one-dimensional photonic crystal has a defect mode which changes along with the change of the refractive index of the defect layer, thus the tunable filtering function is realized. The fiber Bragg grating can acquire the tunable filtering function by selecting different diffraction orders.

Respective component parts and the operating parameters thereof in one embodiment are described as follows. The laser 1 is selected to be a semiconductor CW laser with a ultra-narrow band width in 1550 nm, which has an operating wavelength of 1550 nm at 25° C., an output power of 5 mW, a continuous operating mode, a maximum band width of 50 kHz, and the output fiber type of which is SMF-28 single mode fiber (9/125 μm). Phase modulator 32 is a $LiNbO_3$ electro-optical phase modulator with a wavelength covering range of 700 nm to 1650 nm, and the modulator has a 40 GHz high modulation bandwidth near 1550 nm, an insertion loss of which is <5 dB, the volume of the phase modulator is only $10×1.5×0.95$ cm³. The tunable filter 38 is selected to have a tuning width up to 40 nm, for the central wavelength almost covering the entire C-band (1528 nm~1610 nm), the insertion loss of which is 4.0 dB, the volume of the filter is $24×8.8×35$ cm³. The optical amplifier 33 is selected to have an operating bandwidth of 40 nm, covering the entire C-band. The optical coupler 31 is selected to be the 50/50 optical element in response to the wavelength of 1550 nm. The first optical circulator 35 and the second optical circulator 37 are selected to have a responding wavelength around 1550 nm and a bandwidth of 40 nm, wherein, the first optical circulator 35 is an optical device connected to the absorbing load and provides an optical isolation effect, while the reflected light is absorbed by the absorbing load, then the device provides not only an optical isolation but also an environmental protection effects; while the second optical circulator 37 functions as both participating in the light circulation and light output. The fiber Bragg grating 36 is selected to provide a reflection inhibition effect for the carrier wavelength of 1550 nm. The optical coupler 31 optically couples the light outputted from the laser 1 source together with the light circulated back, the coupled light serves as modulated signal light of the phase modulator 32, the phase modulator 32 changes the frequency of the signal light by the driving of the microwave voltage signal, so as to shifts the frequency of the signal light. When the frequency of the signal light reaches the selected frequency of the tunable filter 38, the tunable filter reflects the light with the selected frequency back to the third output port 4 of the second optical circulator 37 and outputs it, otherwise the signal light will be transmitted with a high transmittance to the input port of the tunable attenuator 39, and then enter the optical coupler 31 to be fed back to the phase modulator 32 again to perform the frequency shift. This frequency shift process is continuously repeated, so that ultimately, the frequency shift of any magnitude is acquired, which is one of the key advantages of the scheme.

To ensure the components in the system not being damaged, the total power of laser 1 and the light circulated back should not exceed the maximum allowable optical power of the phase modulator, and the output port of the tunable filter 38 is connected with the tunable attenuator 39.

Figure 4:
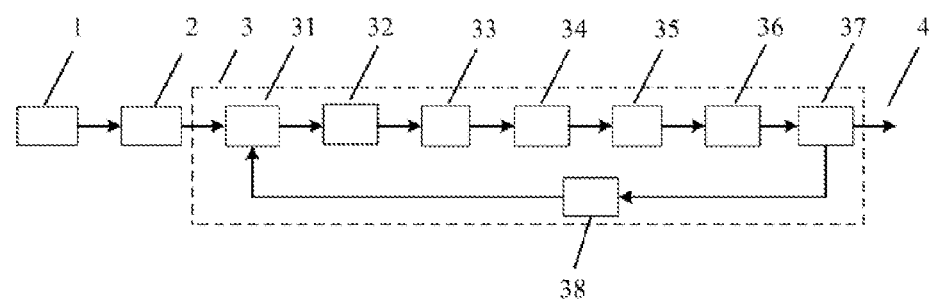
FIG. 4 is a schematic diagram of the third embodiment of the tunable optical frequency converter based on the phase modulator in the present invention.

If the output power of the optical amplifier 33 is set to be small, the tunable attenuator 39 can be omitted, for the embodiment of FIG. 4.

Relative to the prior frequency converter, the present invention has the following outstanding advantages:

(1) Low Price.

Compared to the present expensive frequency converting technology described by the optical parametric oscillator method, optical frequency comb method, or mode-locked laser method, neither the expensive laser source nor the precious nonlinear optical crystal is used in the present invention, so that the cost is greatly reduced.

(2) Compact, Portable.

The whole frequency converter based on the phase modulator is assembled by using commercially available ordinary light sources and optical fiber components, and the final volume is estimated not to exceed $40×10×35$ cm³, weighing no more than 8 kg.

(3) Simple Light Path.

In the apparatus, as all the connections employ optical fibers, and none of the optical element is a movable optical element, the rest parts are easy to be fixed. The device is easy to be optically integrated.

(4) Big Tuning Range or Tuning Width.

Theoretically, the scheme can realize arbitrary frequency output, so long as the bandwidths of tunable filters, phase modulators, optical amplifiers, optical attenuators, optical circulators, optical couplers and transmission fibers are infinitely developed, our scheme will always apply. Even for the current optical components, such as tunable filters, a phase modulators, optical amplifiers, and so on, with an operating bandwidth of only 40 nm, the frequency tuning width of 5 THz is acquired. In short, with the increase of the tuning bandwidths of all the optical components, such as the tunable filter, the phase modulation, and the band-pass amplifier, the range of the frequency shift will increase proportionally.

(5) High Tuning Efficiency.

Tuning frequency of the scheme can be achieved in three ways: on the one hand, the RF drive frequency of the phase modulator is fixed and only the filter frequency of the tunable filter is changed, the frequency changing ability is achieved; on the other hand, the filter frequency of the tunable filter may be fixed, while the RF frequencies is continuously changed; the third way, both are regulated. Ultimate change of the frequency can be acquired by any kind of tuning, and the regulation efficiency thereof is very high.

(6) High Output Power.

Since the maximum gain of the circulating frequency conversion module based on the amplitude modulator can reach 1, so long as the output power of the initial laser source is set, after the circulating frequency conversion is conducted, an output power which is absolutely equal to the initial setting of the laser source can be obtained, at the same time, the desired frequency is also obtained.

Although the present patent has described a number of specific examples, this patent without departing from the spirit of the claims specified, all changes to the person skilled in the art are evident.

What is claimed is:

1. A tunable optical frequency converter based on a phase modulator, comprising:
   a laser (1), a first optical isolator (2), and a circulating frequency shift module (3) based on the phase modulator, wherein
   light output by the laser (1) is input to the circulating frequency shift module (3) to conduct frequency converting repeatedly after passing through the first optical isolator (2), separated by a tunable filter (38) and a second optical circulator (37) of the circulating frequency shift module (3), and frequency converted light is output from a port (4) of the circulating frequency shift module (3).

2. The tunable optical frequency converter according to claim 1, wherein the laser (1) is a semiconductor laser, a gas laser, a solid laser, or a fiber laser with an operating wavelength in the 100 nm-100,000 nm band.

3. The tunable optical frequency converter according to claim 1, wherein an optimum value of a closed-loop gain coefficient of the circulating frequency shift module (3) is 1.

4. The tunable optical frequency converter according to claim 1, wherein the circulating frequency shift module (3) further comprises an optical coupler (31), a phase modulator (32), an optical amplifier (33), a second optical isolator (34), a first optical circulator (35), an optical fiber Bragg grating (36), and a tunable attenuator (39).

5. The tunable optical frequency converter according to claim 4, wherein the phase modulator (32) includes a phase modulator and a frequency modulator.

6. The tunable optical frequency converter according to claim 4, wherein a total power of two combined light beams of the optical coupler (31) cannot exceed a maximum allowable light power of the phase modulator (32).

7. The tunable optical frequency converter according to claim 4, wherein the first optical circulator (35) is a 3-port circulator, wherein, a first port is connected to an output port of the second optical isolator (34), a second port is connected to an input port of the optical fiber Bragg grating (36), and a third port is connected to an absorbing load which absorbs reflected light from the optical fiber Bragg grating (36).

8. The tunable optical frequency converter according to claim 4, wherein the second optical circulator (37) is a 3-port circulator, wherein, a first port thereof is connected to an output port of the optical fiber Bragg grating (36), a second port is connected to an input port of the tunable filter (38), and a third port serves as the port (4) of the circulating frequency shift module (3).

9. The tunable optical frequency converter according to claim 4, wherein an operating frequency bandwidth of respective members in the circulating frequency shift module (3) converting the frequency based on the phase modulator is not less than a frequency difference between a maximum output frequency of the port (4) of the circulating frequency shift module (3) and that of the laser (1).

10. The tunable optical frequency converter according to claim 4, wherein the operating wavelength bands of the first optical isolator (2) and respective members in the circulating frequency shift module (3) are consistent with that of the laser (1).

11. The tunable optical frequency converter according to claim 4, wherein the tunable filter (38) is a narrow-band filter which reflects a narrow-band light desired to be filtered to the port (4) of the second optical circulator (37) so as to output it, and transmits the light with other frequencies to an input port of the tunable attenuator (39), a frequency variation of the frequency converter is equal to a difference between a frequency of the narrow-band output light of the tunable filter (38) and that of an output light of the laser (1), and a tunable frequency range of the frequency converter is not more than that of the narrow-band output light of the tunable filter (38).

12. The tunable optical frequency converter according to claim 11, wherein the tunable filter (38) is a frequency-tunable filter manufactured by one-dimensional defect-photonic-crystal technology or optical-diffraction-grating technology.

13. The tunable optical frequency converter according to claim 12, wherein a photonic bandgap of a one-dimensional photonic crystal is not less than a frequency tuning range of a final output light wave of the tunable optical frequency converter, the one-dimensional photonic crystal includes a refractive index adjustable defect layer, a refractive index adjusting method of which includes electro-induced refractive index change, magneto-induced refractive index change, acoustic-induced refractive index change, photo-induced refractive index change, force-induced refractive index change, or thermal-induced refractive index change, the one-dimensional photonic crystal has a defect mode which changes along with a change of the refractive index of the defect layer.

14. The tunable optical frequency converter according to claim 1, wherein a closed-loop gain coefficient of the circulating frequency shift module (3) is a positive integer other than 1.

15. The tunable optical frequency converter according to claim 1, wherein a closed-loop gain coefficient of the circulating frequency shift module (3) is a reciprocal value of a positive integer other than 1.

* * * * *